United States Patent
Curry et al.

(10) Patent No.: US 6,567,094 B1
(45) Date of Patent: May 20, 2003

(54) SYSTEM FOR CONTROLLING READ AND WRITE STREAMS IN A CIRCULAR FIFO BUFFER

(75) Inventors: Donald J. Curry, Menlo Park, CA (US); David B. Kasle, Mountain View, CA (US); James L. Ball, Santa Cruz, CA (US); Todd W. Thayer, Mountain View, CA (US); Stuart L. Claassen, Santa Clara, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/405,984

(22) Filed: Sep. 27, 1999

(51) Int. Cl.$^7$ .................................................. G09G 5/36
(52) U.S. Cl. ...................... 345/558; 345/542; 345/545; 345/546; 711/110
(58) Field of Search ................................. 345/539, 558, 345/545, 546, 540, 542; 711/110, 117

(56) References Cited

U.S. PATENT DOCUMENTS

| | | | |
|---|---|---|---|
| 4,561,051 A | * 12/1985 | Rodman et al. | 711/152 |
| 5,634,034 A | * 5/1997 | Foster | 711/147 |
| 6,047,334 A | * 4/2000 | Langendorf et al. | 710/5 |
| 6,278,838 B1 | * 8/2001 | Mendenhall et al. | 386/125 |

* cited by examiner

Primary Examiner—Matthew C. Bella
Assistant Examiner—Mackly Monestime (57) ABSTRACT

A distributed digital imaging processing system having a number of processing units and circular FIFO buffers connected together using data transforming streams. Processing units read data from buffers using a transforming read streams. These read streams reorder the buffer data to form patches representing neighborhood pixels and may provide the same data multiple times. After processing a patch, a processing unit writes the resultant patch into a buffer using a transforming write stream which reorders the data into the storage format of the buffer. Several buffers can feed a single processor and one processor can feed several buffers. All the details of each data stream (buffer, current buffer location, patch size, access pattern) are stored in a table entry, along with a pointer to the data stream that it must follow in the buffer to avoid the hazards of reading and writing data out of order. In the case where a buffer has multiple read streams, requiring read streams to maintain a particular order reduces the work necessary to check for either a write or read hazard to comparing the location of a stream with it's leader. A single state machine computes from each table entry all addresses for all data transfers between the processors and buffers, and updates the table entry after each cycle. Since table entries define the streams which link processors to memory, communication paths between processors is completely under software control.

4 Claims, 7 Drawing Sheets

BUFFER INDEX OF PIXELS SENT IN 3 X 3 READ
PATCH, CENTERED ON PIXEL 3 OF SCANLINE 11 AT
THE END OF THE 2nd PASS THROUGH THE BUFER
26 27 28
32 33 34
2 3 4

SYSTEM FOR CONTROLLING READ AND WRITE STREAMS IN A CIRCULAR FIFO BUFFER

BACKGROUND OF THE INVENTION

This invention is a method for controlling the delivery of data to multiple hardware processing units, which perform document image processing. The processing units (PU's) communicate with each other by accessing a shared memory via streams. Each memory access transfers a two dimensional patch of data. Avoidance of shared memory hazards is simplified by the stream ring linked list data structure.

In a typical digital image processing system, a main memory originally contains the source image, and several individual processing units may be needed to process the data in discrete steps before the output image can be printed. In the typical case each processor would have its own process, such as image enhancement, color space transformation, color correction, etc. It would calculate the location of the data in memory, access the data, process the data and then calculate the location in memory that the data must be loaded back into. The processors would also have to prevent memory hazards, such as not allowing data to be fetched by a next processing unit before it has been written by the previous one. Each processing unit is burdened by the computational overhead, and the complexity of the processors is increased.

SUMMARY OF THE INVENTION

In this system, a number of sections of main memory are separated into circular image FIFO buffers, each buffer is associated with one write stream into the buffer and one or more read streams out of the buffer. Each stream is either a write stream or a read stream and provides a sequence of data in the form of small blocks called patches to or from a processing unit from or to a buffer. A single stream control unit (SCU) is used to control all streams. A processor may utilize one or more read streams, and send data out using one or more write streams. A buffer may provide data to one or more processors, but the system is normally limited to having only one stream of data being written into each buffer from one processor. Conceptually, the SCU contains a table of stream descriptions, one entry per stream. Each entry contains all the static and dynamic state associated with a particular stream. This descriptor specifies the patch size and shape, the data source and destination, and a pointer to the location in the buffer where the current data transfer is taking place. The SCU also contains a state machine for executing a process based on this data. As each data transfer is processed, the descriptor line is updated.

To avoid hazards, the SCU has to ensure that, for example, old data is not over-written by new data before it is used. This is accomplished by providing the parameter line of each stream with a pointer identifying the parameter line of the stream that it must follow. For example, if a first PU is loading data into a buffer, and then that data is being sent to a second PU, the reader must not access data until the writer has put the current data into the buffer. Likewise, the writer must not load new data over old data in the circular FIFO buffer that has not been used yet. To prevent this, the write point is forced to follow the read point and the read point is forced to follow the write point. To prevent one from overtaking the other, each of the two stream parameter lines contain pointers to the other line and either stream will be stalled if stepping forward would overtake the other. For the case where there are several readers of a single buffer, each is assigned a relative position, each parameter line is provided with a pointer to the reader or writer that is leading it, and a stream will be stalled if necessary to prevent any one from overtaking any other.

This system simplifies the process by having a central stream control unit handle all of the overhead, which results in two advantages. The first is a saving of time. The SCU is fast enough to process all of the memory computations in real time, so that the pipelined PU's can process data without interruption. They simply request a data transfer and will be allowed to receive or send. The second is a saving in hardware. The single SCU needs only one copy of the hardware that otherwise would have to be provided in all PU's. Because of these advantages, the SCU and PU's can be constructed on a single device.

An additional advantage of this arrangement is that since each control parameter is in the form of a table entry, the entire system is under software control, so that every aspect of the process, such as patch size and data path, can be changed in real time.

DETAILED DESCRIPTION OF THE INVENTION

Document image processing typically requires a sequence of steps in which different algorithms are used to ultimately produce the final document output. It is advantageous to divide up the processing steps among multiple hardware processing units, each of which has a specific processing task. Typically the processing units form a directed acyclic graph with multiple branches that fork and join. Each unit reads in, processes, and then outputs small chunks of two-dimensional data. The small chunks of data are called patches, and different processing units can use different size patches. Due to the two dimensional nature of the image processing, which often requires multiple image lines to be stored to generate vertical context, the amount of memory required to store data from intermediate processing steps is too large to exist on the same chip as the hardware processing units. Therefore the data is stored in an external memory which is shared by the hardware processing units.

Using shared external memory allows centralized control of that memory. Centralized control of the external memory allows centralized control of memory hazards as well as centralized format conversion. A memory hazard occurs when a processing unit tries to read data that has not yet been written or to overwrite data that some other processing unit has not yet to read. Format conversion is required to convert buffer data to/from patches. The hardware unit which controls memory hazards and format conversion is called the Stream Control Unit.

The Stream Control Unit provides a mechanism for hazard and format control through the stream facility, which is analogous to the stream or pipe facility in UNIX. The streams in this image processing system have the extra functionality of converting buffer data to/from two dimensional patch data and are referred to as transformation streams.

Employing this model makes it possible for image processing units to be much simpler. Units can read and write data without knowing what memory locations they are accessing, what part of the image they are working on, or anything about the other units involved in the processing tree. The Stream Control Unit's stream facility keeps track of memory addresses and all shared data dependencies between the various processing units in a manner that is invisible to the processing units.

Shared data is located in sections of memory called stream buffers. Although an entire image must be processed, typically only a small portion of the image is stored at any one time. That portion is stored in a stream buffer. As time goes on, the portion of the image which is stored in the stream buffer changes; the stream buffer acts as a circular image buffer or image FIFO. For ease of address calculation, every pixel in an image maps to a particular location in a stream buffer. Transforming write streams move data from PU's to stream buffers and transforming read streams move data from buffers to PU's. Each processing unit accesses stream buffer data by sending a stream request to the Stream Control Unit, which is simply a request to access the next piece of data. The Stream Control Unit keeps track of all outstanding processing unit stream requests, and checks each request to insure that it can be executed without violating shared data synchronization. When the Stream Control Unit finds that a request can be fulfilled, it issues the corresponding memory request(s) to the memory system. Using a programmable descriptor table in this shared unit allows the imaging pipeline to be easily reconfigured through software. In addition, it allows the various processing tasks to be prioritized as needed.

Figure 1:
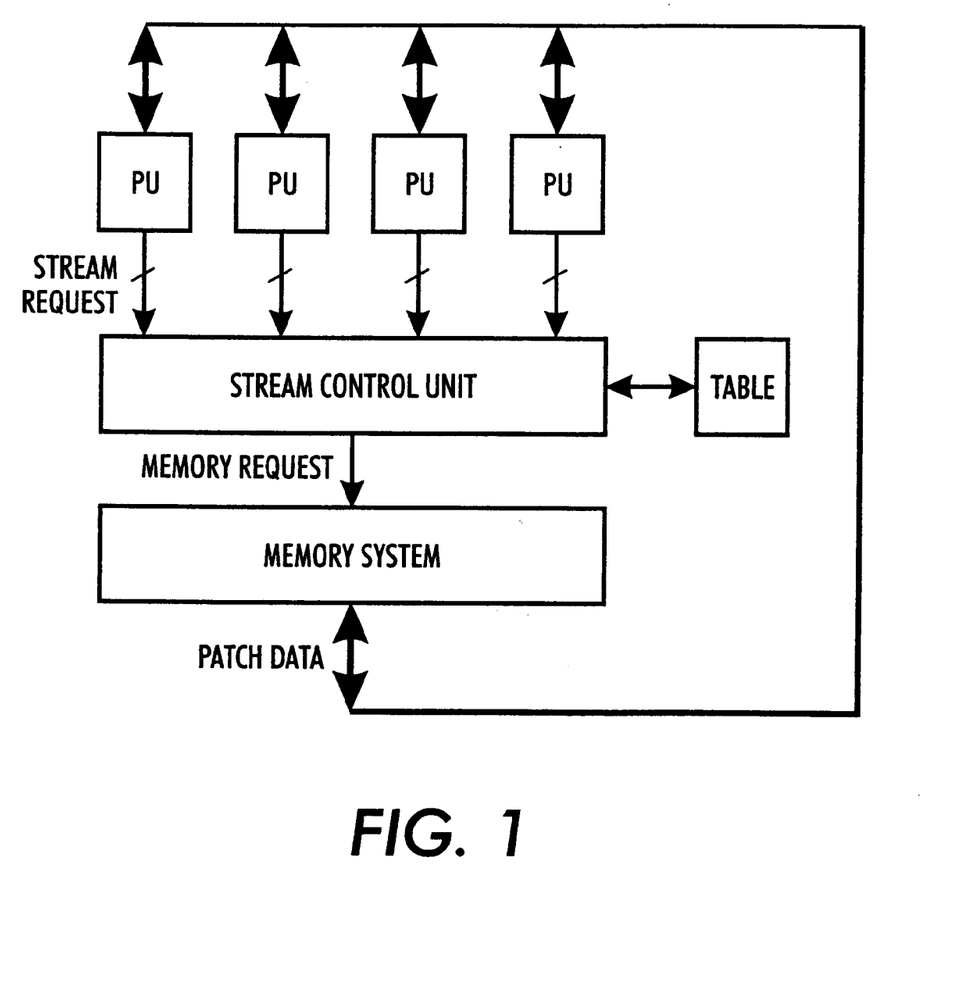
FIG. 1 is an overall block diagram of the invention with Stream Control connections.

FIG. 1 shows an example of the overall system with the Stream Control Unit connected with five processing units (PU's). Typically, there would be many more processing units. The processing units inform the Stream Control Unit that they are ready to perform a memory transfer by asserting their stream request lines. There is one stream request line for each stream processed by a processing unit. A processing unit can have any number of stream request lines, which can all access the same buffer or any mix of different buffers. the controller inspects the corresponding line in the table to determine if the request can be granted, calculates the addresses required to access the buffer and supplies them to the memory system which executes the specified patch transfer on the data bus. The data flows between the memory system and the processing unit without further Stream Control Unit involvement.

Each stream request signals a need to access a portion of a stream buffer. The portion accessed is called a patch. The patch can be thought of as a moving window looking into a small portion of the stream buffer. A processing unit can read or write the piece of stream buffer data which is in the current patch. Upon issuing a memory request for a stream, the Stream Control Unit moves the stream's patch position to the next location in the stream buffer that the stream will need to access. The size of each patch is set to match the requirements of each processing unit. Different patch sizes for the different streams accessing the same stream buffer may be mixed freely; there are no restrictions. The patch size stays constant as the patch position moves through the buffer. A patch is defined in terms of a rectangular array of pixels.

A stream buffer is circular in the sense that a patch cycles through it many times. A patch starts at the beginning of the stream buffer, then traverses through the entire buffer, and one step at a time. Upon completing its traverse, it jumps back to the beginning position in the stream buffer for its next cycle through the buffer Every time a processing unit is granted access to a patch in a stream buffer, the Stream Control Unit changes the location of the patch associated with the stream request. The patch is moved from the location of the data the processing unit is currently being allowed to access to the location that the processing unit will access with its next request. Thus the patch is always positioned where the processing unit's next request will be located. This allows a processing unit to read or write a whole stream buffer, one contiguous piece at a time. The Stream Control Unit keeps track of the location of each patch in the buffer. It uses this information to decide when a stream request is allowed to proceed without generating a memory hazard. A read stream waits until the data in its patch's current location is available (has been written). A write stream waits until the data in its patch's current location is empty (has been read by every stream that requires that data.) If a stream request cannot proceed, the Stream Control Unit stores that request until it detects that the request can be honored. A stream may have only one request outstanding at a time.

Figure 2:
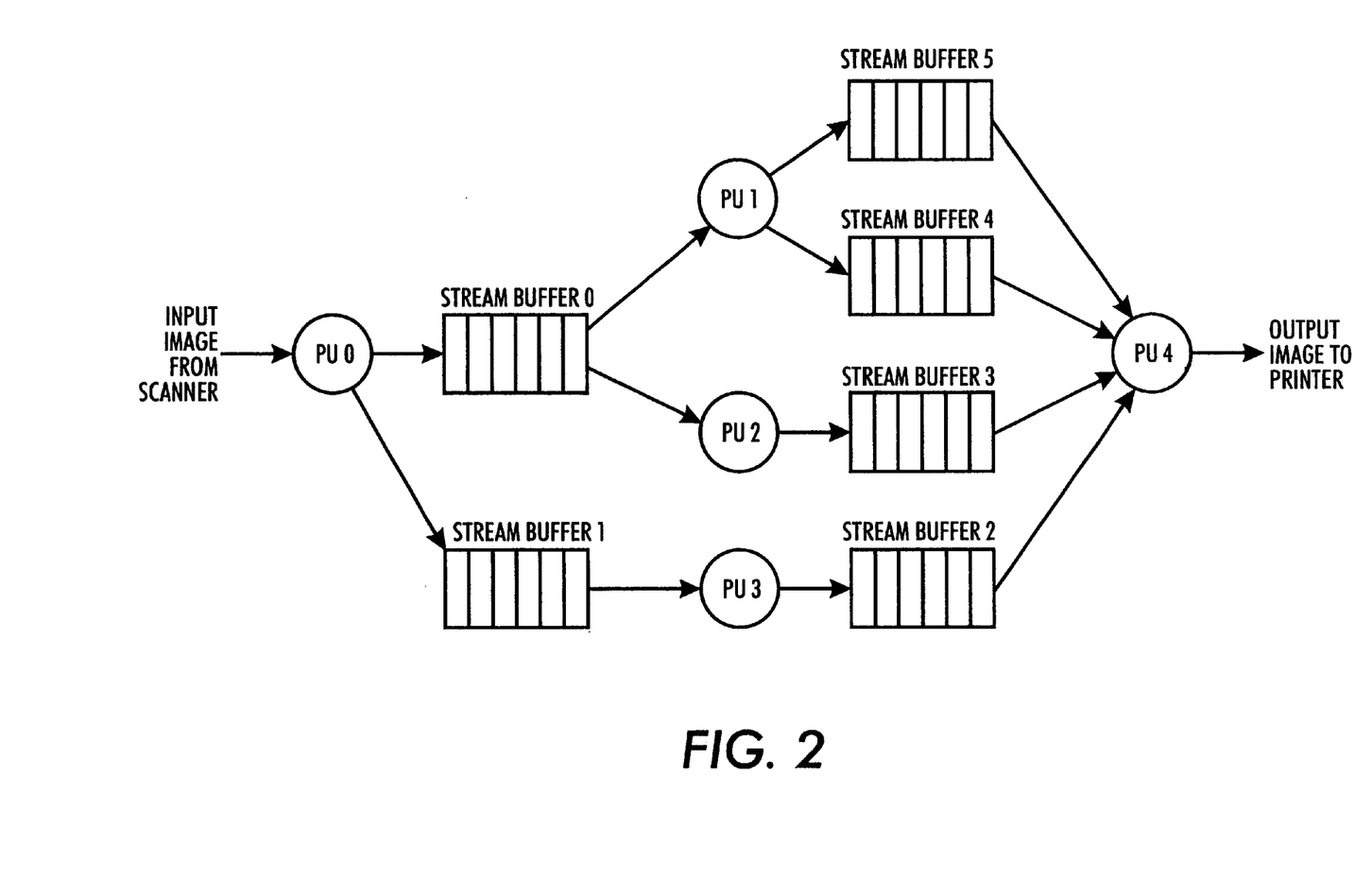
FIG. 2 is a conceptual diagram of PU's and Stream Buffers for a given operation.

FIG. 2 shows an example of how the five processing units from FIG. 1 might be connected (via the Stream Control Unit) to form an imaging pipeline for a digital copier. A directed line that points to a stream buffer represents a write stream and a directed line that points away from a stream buffer represents a read stream. The stream buffers store some intermediate portion of the image being processed. They act as a conduit through which processing units are virtually connected.

Pixels originate from the scanner, flow through the processing units, and are forwarded to the printer. Most stream buffers in this example have only one write stream and one read stream. The exception is Stream Buffer 0 which has two read streams going to PU1 and PU2. These two processing units each get a copy of the image written by PU0. Processing units which have multiple read streams combine images (e.g. pixels & tags). Processing units which have multiple write streams produce several versions of the same image (e.g. grey scale and full color).

Each stream is associated with only one stream buffer. The stream descriptors in the SCU are set up so that all the streams connected to a particular stream buffer are ordered and doubly-linked to form a stream ring. A stream ring consists of one write stream and one or more read streams grouped together in an arrangement analogous to a write pointer and one or more read pointers of a FIFO. Each stream has a single leader (which it must be behind in the stream buffer) and a single follower (which it must precede in the stream buffer.) In the case of multiple read streams, it is not desirable to have all read streams share the write stream as their leader because the write stream would then have to have all the read streams not only as its followers, but also as its leaders, so that multiple tests would be required to see if the write stream patch could move without generating a memory hazard. The write stream is special and is called the first stream—it accesses the buffer first and gets the chain started.

Figure 3:
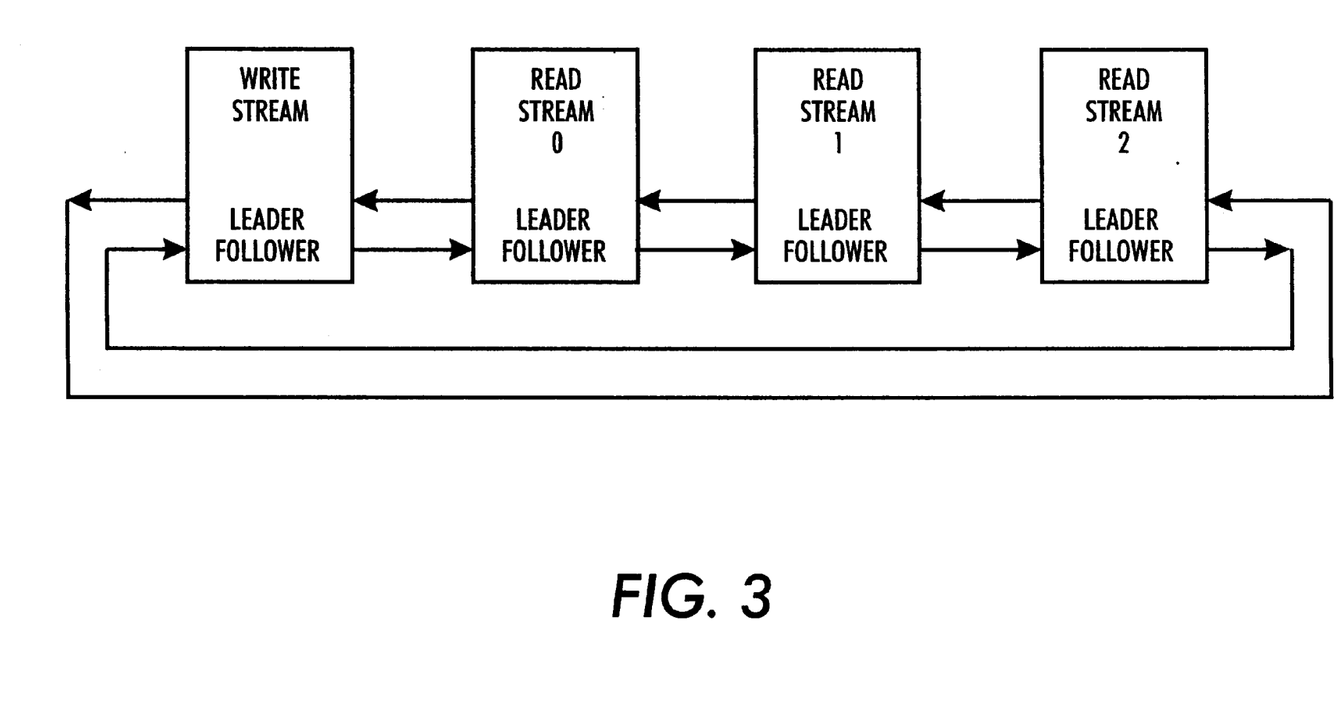
FIG. 3 is an example of a stream ring.

FIG. 3 shows an example stream ring with one write stream and three read streams. The directed lines represent the linked list pointers and the rectangles represent the stream data structures. Only the link to the leader is required for normal operation. The link to the follower provides a way to accelerate access to streams which have been blocked by the current stream.

The stream ring simplifies the process of preventing memory hazards. Before a stream accesses a particular location in a stream buffer, the stream's leader must access that location. If the stream's leader has already accessed the image area in the stream's patch and will not access any of that area again until its next cycle through the stream buffer, then the stream can access memory without generating a memory hazard. Thus the only test required to determine if it is safe for a stream to proceed is to compare the position of the stream's patch to the position of its leader's patch. The process of determining if a stream can access a stream buffer location is called Queue Check.

Depending on the processing unit's function, a patch may have context, i.e., a patch position for a given stream may have some overlap with another patch that occurs later for the same stream. This is required if the function needs to have access to the same pixels more than once, as is the case for say a 3 by 3 filter. This must be taken into account when performing Queue Check. This means that Queue Check must not only insure that the leader stream's patch has traversed the area occupied by the current stream's patch, but must also make sure that the leader stream's patch will not occupy any part of that area again until its next cycle through the stream buffer. In some cases, where the leaders patch movement is more complex, two positions could be provided. One is for use by the follower stream and describes the last pixel in the buffer which is free to be used. The second location is for internal use of the stream itself and describes the actual position of the patch.

Some memory systems allow out of order execution of memory access commands in order to improve efficiency. If this is the case, then Queue Check must compare the position of the current stream's patch to the previous position of its leader's patch. Only if it can be reliably determined that the leader stream's last memory access. has already been executed can the leader stream's current patch position be used by Queue Check.

Figure 4:
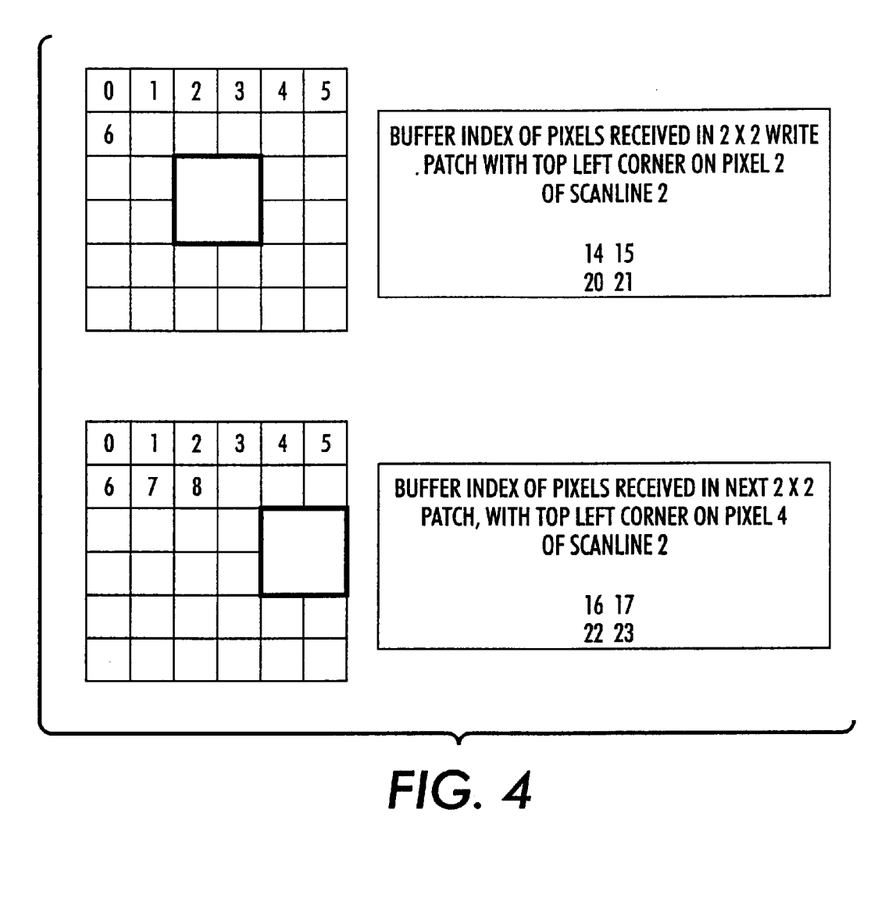
FIG. 4 shows and example of reordering of a write patch.

FIG. 4 shows the movement of a 2×2 write patch through a buffer. Typically, write patches do not overlap in either x or y and step through the buffer with a step size equal to their width. The figure shows the reordering of pixels which occurs when pixels in the patch arrive at the buffer.

Figure 5:
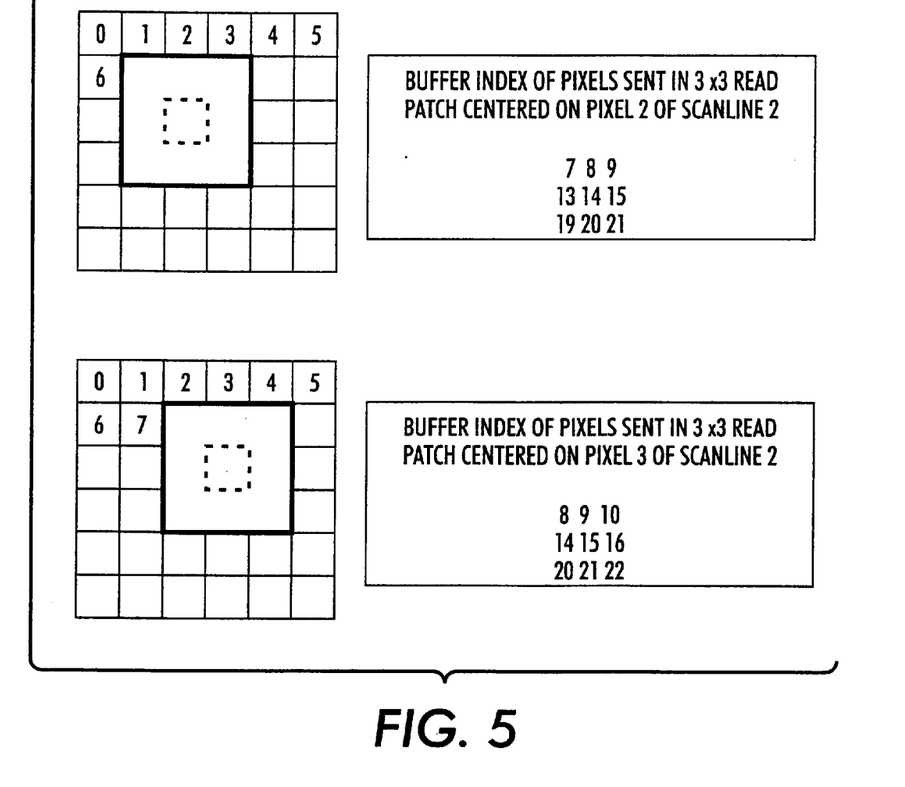
FIG. 5 shows overlapped stepping, reordering and pixel replication for a read patch.

FIG. 5 shows the movement of a read patch through a buffer and how pixels are reordered into the patch from the buffer. This also shows the same pixels being sent in multiple patches for the stream in the same pass. Note that for read stream, the patch step size does not necessarily equal the patch size.

Figure 6:
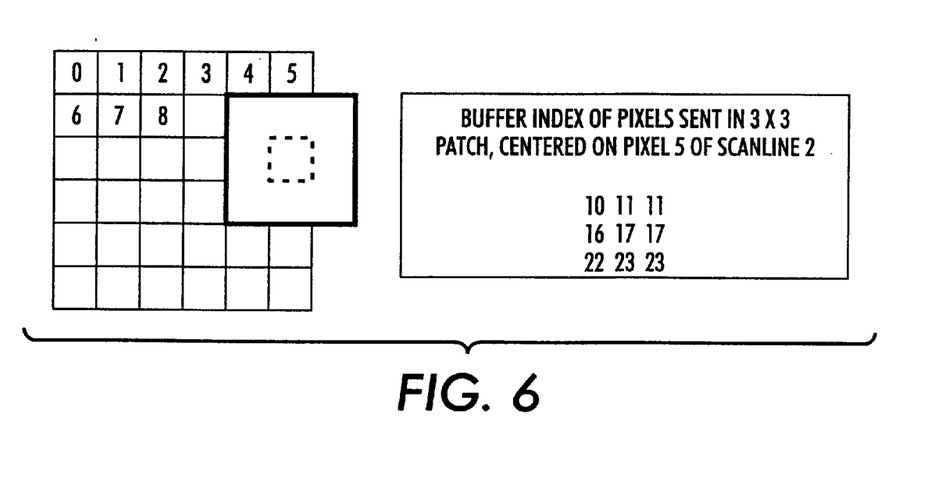
FIG. 6 is an example of edge pixel fill in for a read patch on the edge of the buffer.

FIG. 6 shows a read patch near the edge of a buffer where 3 of the pixels have been filled in by copying corresponding edge pixels. The SCU provides special controls to the memory system describing how to fill in missing pixels at all four edges of the image. The combination of reordering buffer pixels into patches and automatically providing missing pixels greatly simplifies the design of PU's.

Figure 7:
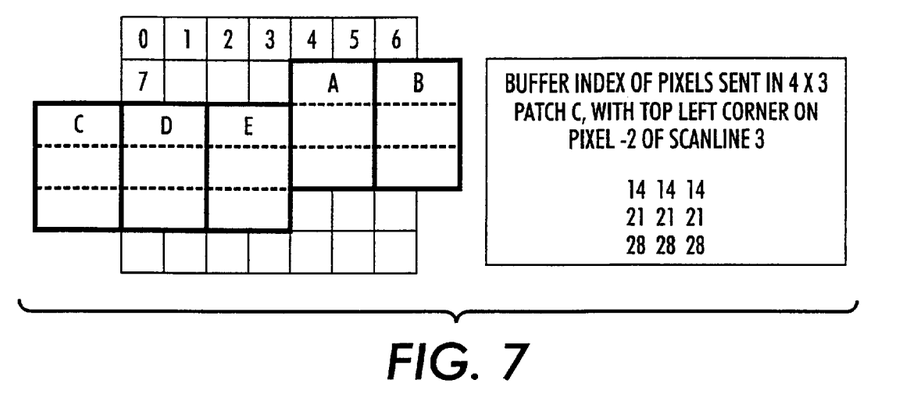
FIG. 7 shows a more typical example of a read patch scanning sequence with only vertical overlaps an extra patches between scans to reinitialize PU state.

FIG. 7 shows the movement of a read patch through a buffer showing more typical example in which there is no overlap in the x direction and only pixels which overlap in the y direction are sent multiple times. This also shows an extra patch (C) generated using edge replication as the fill function which is sent to the PU to reinitialize internal state prior to beginning the next scan line.

Figure 8:
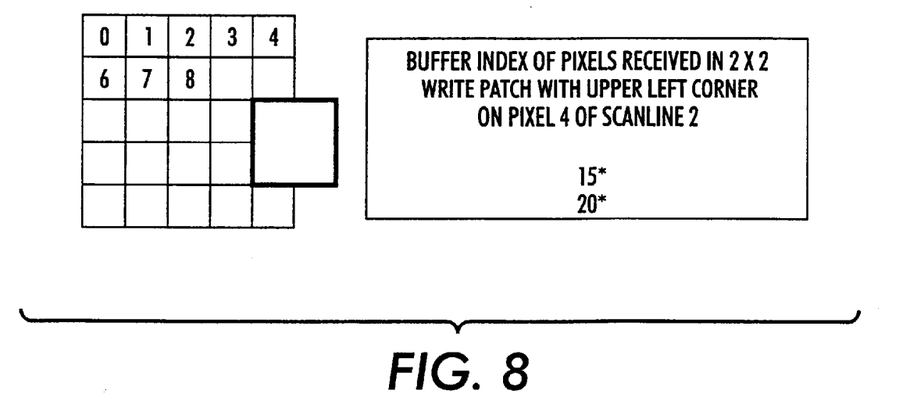
FIG. 8 is an example of a write patch edge overlap.

FIG. 8 shows a write patch at the edge of a image where only two of the four pixels of the patch data is reordered into the buffer. The other two pixels in the patch are ignored.

Figure 9:
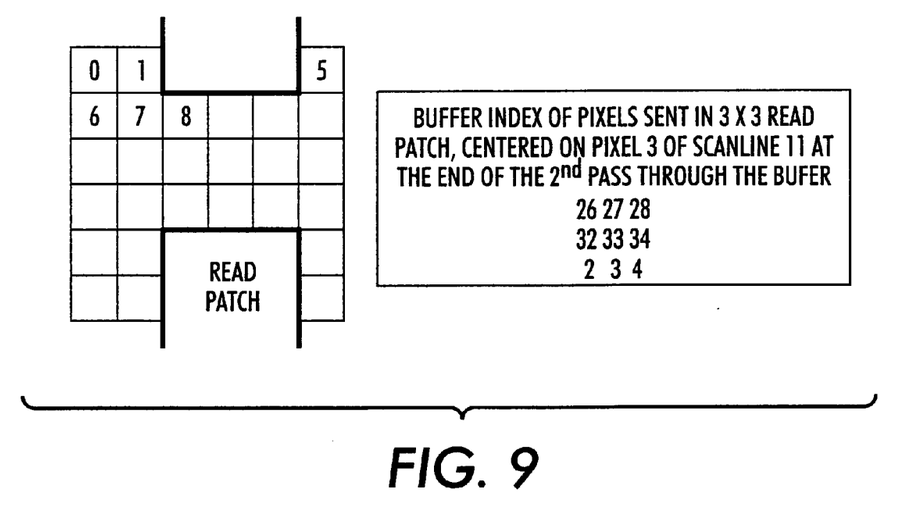
FIG. 9 shows a read patch wrapping around the end of a circular buffer.

FIG. 9 shows ther reordering which occurs as a read patch wraps around at the end of a buffer. The SCU is programmed with the size of the overall image and can tell the memory system to replicate, or set to a fixed value, top and bottom pixels in the image if the patch is currently overlapping the first or last scan line.

Figure 10:
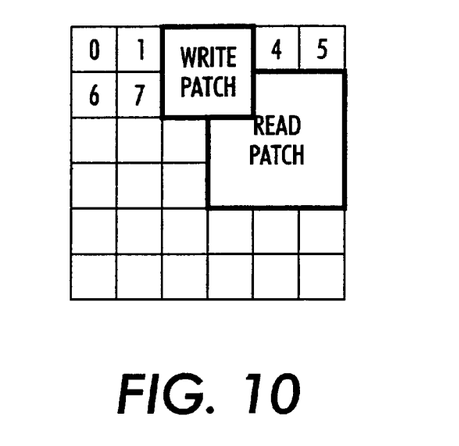
FIG. 10 shows a Queue Check fail condition.

A graphical illustration of the application of Queue Check is shown in FIG. 10 for a stream ring with just two streams. The patches for a write stream and a read stream are shown. Because there are only two streams, the write stream is the read stream's leader and the read stream is the write stream's leader. The patches are located where the next data accesses will occur. Executing Queue Check for the write stream will fail since pixel 9 has not yet been read.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A system for controlling read and write streams in a circular FIFO buffer, comprising:

a circular FIFO buffer having a circulating write point where the data is to be written into the buffer followed by one or more circulating read points where data is to be read from the buffer;

the movement of the read and write points being constrained to maintain their relative order as all proceed through the buffer by each determining the position of the one read or write point immediately ahead of itself to determine whether it may proceed;

wherein each data write causes the data written into the buffer to be reordered in the buffer, wherein the data is in the form of an image having edges, a patch is defined as a number of pixels in each direction from a current pixel and wherein a stream transform is adapted to ignore pixels that are written outside the edge of the image.

2. A system for controlling read and write streams in a circular FIFO buffer, comprising:

a circular FIFO buffer having a circulating write point where the data is to be written into the buffer followed by one or more circulating read points where data is to be read from the buffer;

the movement of the read and write points being constrained to maintain their relative order as all proceed through the buffer by each determining the position of the one read or write point immediately ahead of itself to determine whether it may proceed;

wherein each data read causes the transferred data to be reordered from the buffer memory and the same data may be read one or more times;

wherein the data is in the form of an image having edges, a patch is defied as a number of pixels in each direction from a current pixel, and wherein the stream transform is adapted to pad the patch for pixels that are outside the edge of the image with a predetermined values or values which are computed from pixels near the edge of the image.

3. A distributed data processing system, comprising:

a circular FIFO buffer having a circulating write point where the data is to be written into the buffer followed by one or more circulating read points where data is to be read from the buffer;

the movement of the read and write points being constrained to maintain their relative order as all proceed through the buffer by each determining the position of the one read or write point immediately ahead of itself to determine whether it may proceed;

two processors, each adapted to produce a data write stream request or a read stream request to indicate the need to write data to or read data from the buffer, and a stream controller, responsive to a data request, for
 a) identifying a stream associated with the request;
 b) identifying a source or destination buffer;
 c) determining a location where data is to be written or read in the buffer;
 d) ensuring that data will not be written into a buffer location until previous data is no longer needed for reading, and that a location will not be read out until all data needed has been written into the buffer; and
 e) issuing memory control information to a memory controller to irate the data transfer;

wherein the stream controller maintains a linked list of table entries for each data stream comprising a pointer to the current point in the buffer where data is being written or read, and a pointer to the table entry of the data stream which must precede it, to prevent a following stream overtaking a leading stream, and wherein a buffer's write stream is first in his linked list and all read streams for the buffer are ordered to follow it so that a last read stream becomes a leader for the buffer's write stream forming a circular list, and so that the write stream can check that old data has been read by the last read stream before reusing the location for new data.

4. The system of claim 3 where links to followers are maintained in each table entry to allow fast servicing of blocked transfers.

* * * * *